United States Patent
Kamijima (10) Patent No.: US 8,788,851 B2
(45) Date of Patent: Jul. 22, 2014

(54) ELECTRIC DEVICE POWER CONTROL OPTIMIZED TO DEVICE OPERATIONAL LOAD STATE

(75) Inventor: Junya Kamijima, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 513 days.

(21) Appl. No.: 13/095,908

(22) Filed: Apr. 28, 2011

(65) Prior Publication Data

US 2012/0210153 A1    Aug. 16, 2012

(30) Foreign Application Priority Data

Feb. 10, 2011  (JP) ................................. 2011-027866

(51) Int. Cl.
*G06F 1/26*  (2006.01)

(52) U.S. Cl.
USPC .......................................... 713/300; 713/320

(58) Field of Classification Search
USPC ................................ 713/320, 322, 340, 300
See application file for complete search history.

(56) References Cited

U.S. PATENT DOCUMENTS

| 5,339,445 | A  | * | 8/1994 | Gasztonyi ..................... 713/324 |
| 7,337,339 | B1 | * | 2/2008 | Choquette et al. ............ 713/320 |
| 2004/0163001 | A1 | * | 8/2004 | Bodas ............................ 713/300 |
| 2007/0050647 | A1 | * | 3/2007 | Conroy et al. ................ 713/300 |

FOREIGN PATENT DOCUMENTS

| JP | 2005-182522 A | 7/2005 |
| JP | 2007-233782 A | 9/2007 |

* cited by examiner

*Primary Examiner* — Chun Cao
(74) *Attorney, Agent, or Firm* — Judge Patent Associates (57) ABSTRACT

An electric power control device includes: a power consumption monitoring section for monitoring electric power consumed by an electronic device; a moving average calculation section for calculating a moving average of the power consumption of the electronic device, based on the power consumption monitored by the power consumption monitoring section; a state-of-load determination section for determining state of the operational load on the electronic device, based on the moving average calculated by the moving average calculation section; and a control section configured to control the electronic device to operate either in a restriction mode in which an upper limit corresponding to state of load determined by the state-of-load determination section is imposed, or in a restriction release mode in which the upper limit is not imposed.

9 Claims, 8 Drawing Sheets

ELECTRIC DEVICE POWER CONTROL OPTIMIZED TO DEVICE OPERATIONAL LOAD STATE

CROSS REFERENCE TO RELATED APPLICATION

The disclosure of Japanese Patent Application No. 2011-27866, filed on Feb. 10, 2011, is incorporated herein by reference.

BACKGROUND OF THE INVENTION

1. Field of the Invention

The present invention relates to electric power control devices and electric power control methods for controlling electronic-device power consumption, and relates more particularly to electric power control devices and electric power control methods for controlling electronic-device operation according to the state of operational load on the electronic device.

2. Description of the Background Art

In recent years, electronic devices such as portable notebook computers, for example, are furnished with battery packs housing a battery that is usable while being repeatedly recharged. Thus, even in locations where no AC (alternating current) power supply is available, running the battery operates the system overall.

Against that backdrop, so-called low power consumption technology is under investigation to allow portable electronic devices, typified by these portable notebook computers and the like, to be used for extended periods even in locations where no AC power supply is available.

For example, in a computer device described in Japanese Laid-Open Patent Publication No. 2005-182522, the CPU (Central Processing Unit) is controlled to operate at either a high performance level or a low performance level based on the power supplied from the battery pack.

However, with computer devices of the conventional technology, source power supplied to the CPU is controlled based on battery information and on the power supplied to the CPU from the battery or elsewhere, and, in that situation, operation of the CPU is not controlled according to the use state (load state) of the CPU. A consequent problem has been, for example, that power consumption is minimized beyond necessity, such that the CPUs performance in the electronic device is not demonstrated.

SUMMARY OF THE INVENTION

Therefore, an object of the present invention is to provide an electric power control device and an electric power control method for performing the optimum operational control in essence required for an electronic device to run, according to the state of operational load on the electronic device, thereby realizing reduced power control accorded to the working load on the electronic device.

In order to attain the aforementioned objects, an electric power control device according to the present invention is an electric power control device for controlling electric power consumed by an electronic device, and the electric power control device includes: a power consumption monitoring section for monitoring the electric power consumed by the electronic device; a moving average calculation section for calculating a moving average of the power consumption of the electronic device, based on the power consumption monitored by the power consumption monitoring section; a state-of-load determination section for determining state of the operational load on the electronic device, based on the moving average calculated by the moving average calculation section; and a control section configured to control the electronic device to operate either in a restriction mode in which an upper limit corresponding to the state of load determined by the state-of-load determination section is imposed, or in a restriction release mode in which the upper limit is not imposed.

Further, preferably, the control section is further configured to select between the restriction mode and the restriction release mode based on a timing signal indicating that the electronic device operates in a restriction period during which the upper limit corresponding to the state of load determined by the state-of-load determination section is imposed, or in a restriction release period during which the upper limit is not imposed.

Moreover, preferably, the state-of-load determination section determines, based on the moving average calculated by the moving average calculation section, a load zone preestablished in correspondence with the power consumption of the electronic device.

Furthermore, preferably, in the restriction mode, the control section imposes, in correspondence with the load zone, the upper limit of source power supplied to the electronic device, the upper limit of power to a central processing unit of the electronic device, or the upper limit of operating frequency of a central processing unit of the electronic device.

Further, preferably, the load zone is classified into a plurality of load ranges.

Furthermore, preferably, the electronic device is any one a portable personal computer, a portable information terminal, and a mobile telephone.

In order to attain the aforementioned objects, an electric power control method according to the present invention is an electric power control method for execution by an electric power control device to control electric power consumption an electronic device, and the electric power control method includes: a power consumption monitoring step of monitoring the electric power consumed by the electronic device; a moving average calculation step of calculating a moving average of the power consumption of the electronic device, based on the power consumption monitored in the power consumption monitoring step; a state-of-load determination step of determining state of the operational load on the electronic device, based on the moving average calculated in the moving average calculation step; a restriction period determination step of determining whether the electronic device operates in a restriction period during which an upper limit corresponding to the state of load determined in the state-of-load determination step is imposed or in a restriction release period during which the upper limit is not imposed; and an electronic device control step of controlling operation of the electronic device by imposing the upper limit corresponding to the state of load determined in the state-of-load determination step, when the device is determined to operate in the restriction period in the restriction period determination step, and by not imposing the upper limit when the device is determined to operate in the restriction release period in the restriction period determination step.

Further, in order to attain the aforementioned objects, a process performed by each component of the electric power control device according to the present invention described above may be implemented as an electric power control method providing a series of process steps. The method is implemented in a form of a program for causing the computer to execute the series of process steps. The program may be stored in a computer-readable storage medium, and used in the computer.

As described above, in the electric power control device and the electric power control method according to the present invention, an optimum operational control in essence required for the electronic device to run can be performed according to a state of operational load on the electronic device, thereby realizing reduced power control according to the working load on the electronic device.

The present invention is applicable to, for example, an electric power control device for controlling electric power consumed by an electronic device, and is particularly applicable to a portable personal computer, a portable information terminal, a mobile telephone, and the like which require reduced power consumption.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, one embodiment of the present invention will be described with reference to the drawings.

Figure 1:
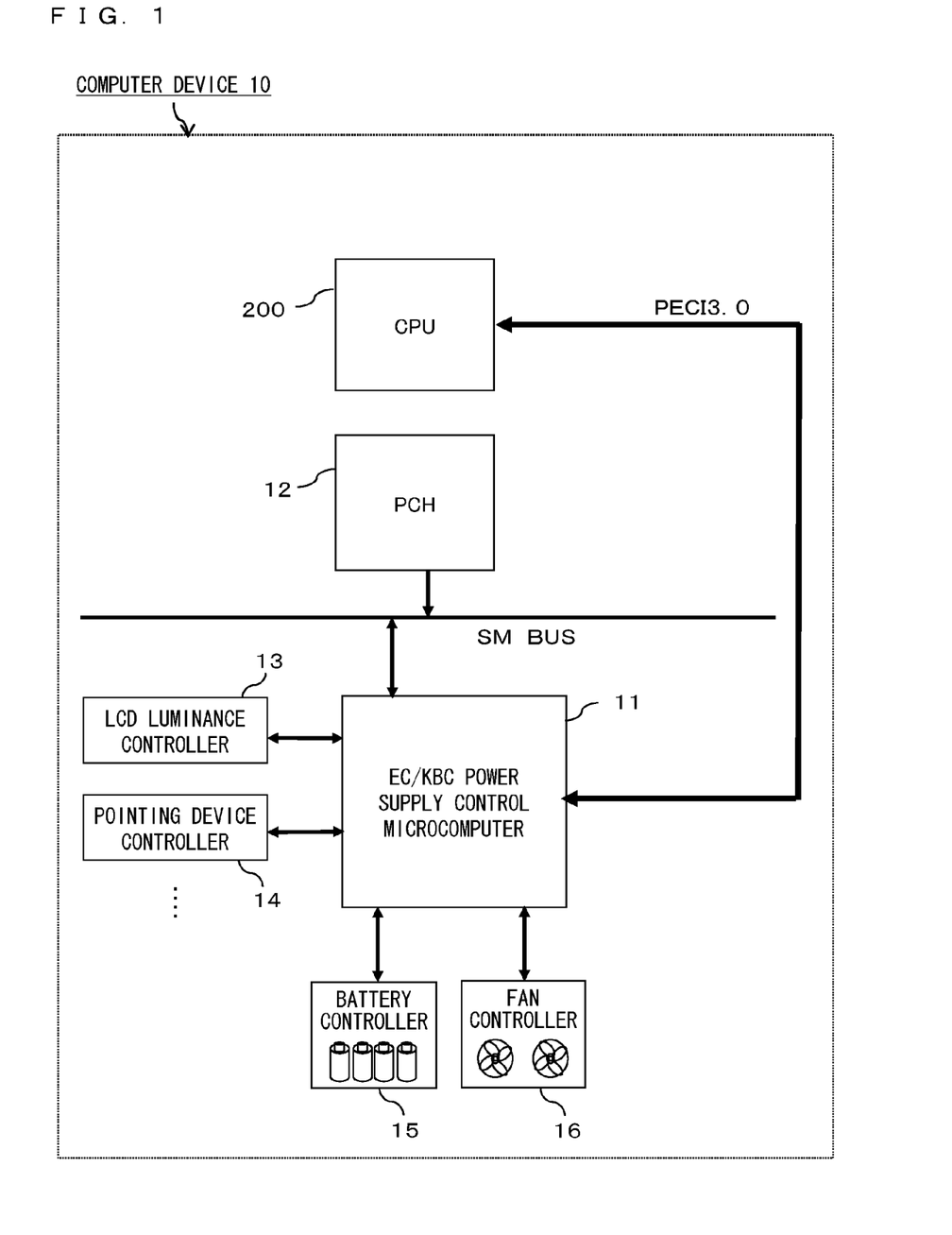
FIG. 1 is a diagram schematically illustrating a configuration of a computer device 10 which uses an electric power control device and an electric power control method according to one embodiment of the present invention.

FIG. 1 is a diagram schematically illustrating a configuration of a computer device 10 which uses an electric power control device and an electric power control method according to one embodiment of the present invention. In FIG. 1, the computer device 10 includes: an EC (embedded controller)/ KBC (keyboard controller) power supply control microcomputer 11; a PCH (platform controller hub) 12; an LCD (liquid crystal display) luminance controller 13; a pointing device controller 14; a battery controller 15; a fan controller 16; and a CPU 200.

In the present embodiment, a portable personal computer typified by, for example, a notebook computer will be described. However, the electric power control device and the electric power control method according to one embodiment of the present invention are applicable to, for example, a portable information terminal and a mobile telephone as well as a portable personal computer.

The EC/KBC power supply control microcomputer 11 can communicate with the CPU 200 via a PECI (Platform Environment Control Interface) 3.0, monitors electric power consumed by the CPU 200, and further controls the CPU 200. For example, the EC/KBC power supply control microcomputer 11 controls: source power supplied from a power supply to the CPU; electric power on which the CPU operates; and a frequency at which the CPU operates. The EC/KBC power supply control microcomputer 11 and the CPU 200 are configured to communicate with each other via the PECI 3.0. However, the configuration is not limited to such a configuration. For example, any configuration for monitoring electric current and voltage of the CPU 200 to calculate electric power consumed by the CPU 200 may be used.

Further, the EC/KBC power supply control microcomputer 11 manages the LCD luminance controller 13, the pointing device controller 14 for a pointing device such as a keyboard and a mouse; the battery controller 15, and the fan controller 16, via an SMBus (System Management Bus). The controlling and managing functions of the EC/KBC power supply control microcomputer 11 described in the present embodiment are examples. In addition thereto, the EC/KBC power supply control microcomputer 11 has various controlling and managing functions such as a function of monitoring and controlling a power supply switch.

Hereinafter, a function of the EC/KBC power supply control microcomputer 11 for controlling and managing CPU operation will be described in detail.

Figure 2:
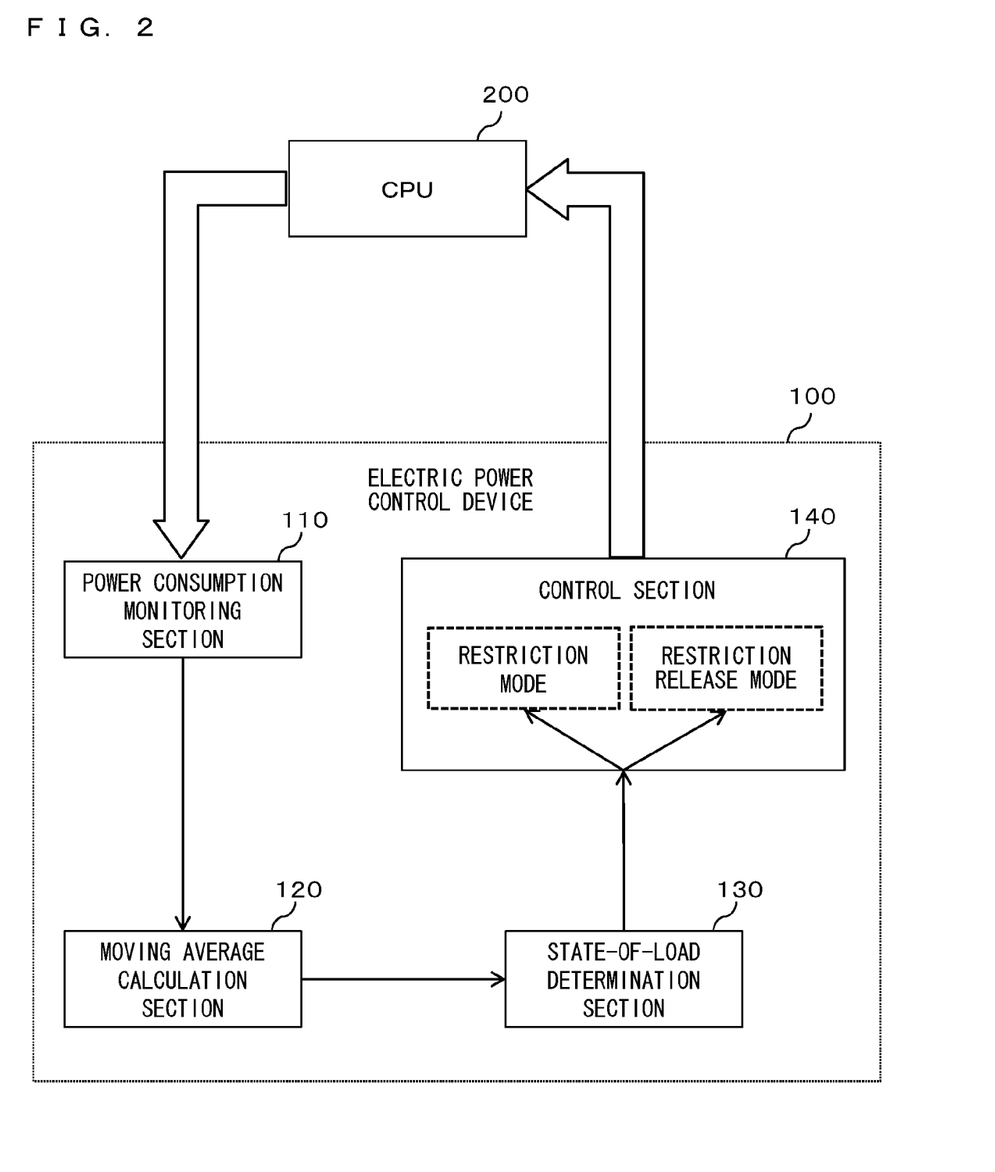
FIG. 2 is a functional block diagram schematically illustrating an electric power control device 100 according to one embodiment of the present invention.

FIG. 2 is a functional block diagram schematically illustrating an electric power control device 100 according to one embodiment of the present invention. As shown in FIG. 2, the electric power control device 100 includes: an electric power consumption monitoring section 110; a moving average calculation section 120; a state-of-load determination section 130; and a control section 140, and controls electric power consumed by the CPU 200.

The electric power consumption monitoring section 110 monitors electric power consumed by the CPU 200. The electric power consumption monitoring section 110 may monitor electric power consumed by the CPU 200 by monitoring electric current and voltage.

The moving average calculation section 120 calculates, based on the consumed electric power monitored by the electric power consumption monitoring section 110, a moving average of the electric power consumed by the CPU 200. More specifically, since electric power consumed by the CPU 200 minutely varies in practice, a moving average is calculated so as to smooth time-series data of the electric power consumed by the CPU 200. As the moving average, for example, a simple moving average, a weighted moving average, or an exponential moving average may be used.

The state-of-load determination section 130 determines a state of operational load on the CPU 200, based on the moving average calculated by the moving average calculation section 120. As described above, the electric power consumed by the CPU 200 minutely varies in practice. Therefore, the state-of-load determination section 130 determines a state of operational load on the CPU 200, based on the moving average obtained by smoothing the electric power consumed by the CPU 200.

The control section 140 controls the operation of the CPU 200. Specifically, the control section 140 controls the CPU 200 to operate either in a restriction mode or in a restriction release mode. In the restriction mode, an upper limit corresponding to the state of load determined by the state-of-load determination section 130 is imposed. On the other hand, in the restriction release mode, the upper limit is not imposed.

The control section 140 controls switching between the restriction mode and the restriction release mode, according to whether a timing signal (not shown) indicates a restriction period during which the upper limit corresponding to the state of load determined by the state-of-load determination section 130 is imposed, or indicates a restriction release period during which the upper limit is not imposed.

As described above, the electric power control device 100 controls the operation of the CPU 200, based on the electric power consumed by the CPU 200, according to the state of operational load on the CPU 200.

Figure 3:
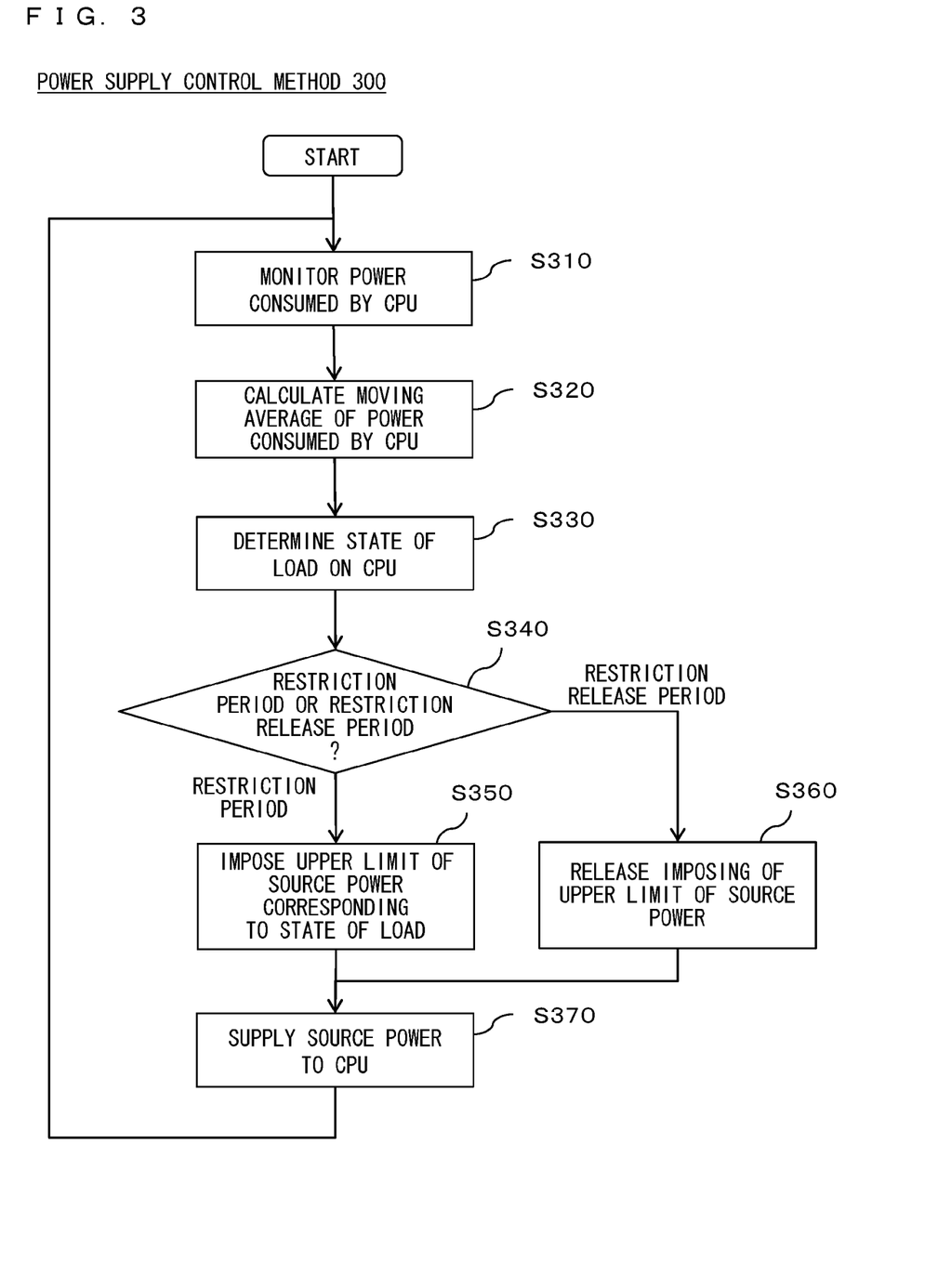
FIG. 3 is a flow chart showing a flow of a process of an electric power control method 300 performed by the electric power control device 100 according to one embodiment of the present invention.

Next, a flow of a process of an electric power control method performed by the electric power control device 100 according to one embodiment of the present invention will be described in detail. FIG. 3 is a flow chart showing a flow of a process of an electric power control method 300 performed by the electric power control device 100 according to one embodiment of the present invention. In FIG. 3, the electric power control method 300 includes: an electric power consumption monitoring step S310; a moving average calculation step S320; a state-of-load determination step S330; a restriction period determination step S340; a source power upper limit imposing step S350; a source power upper limit imposing release step S360; and a source power supply step S370. In the present embodiment, an exemplary case in which the control section 140 controls source power to be supplied to the CPU 200 to control the operation of the CPU 200, will be described.

In the electric power consumption monitoring step S310, the electric power consumption monitoring section 110 monitors electric power consumed by the CPU 200.

Figure 4:
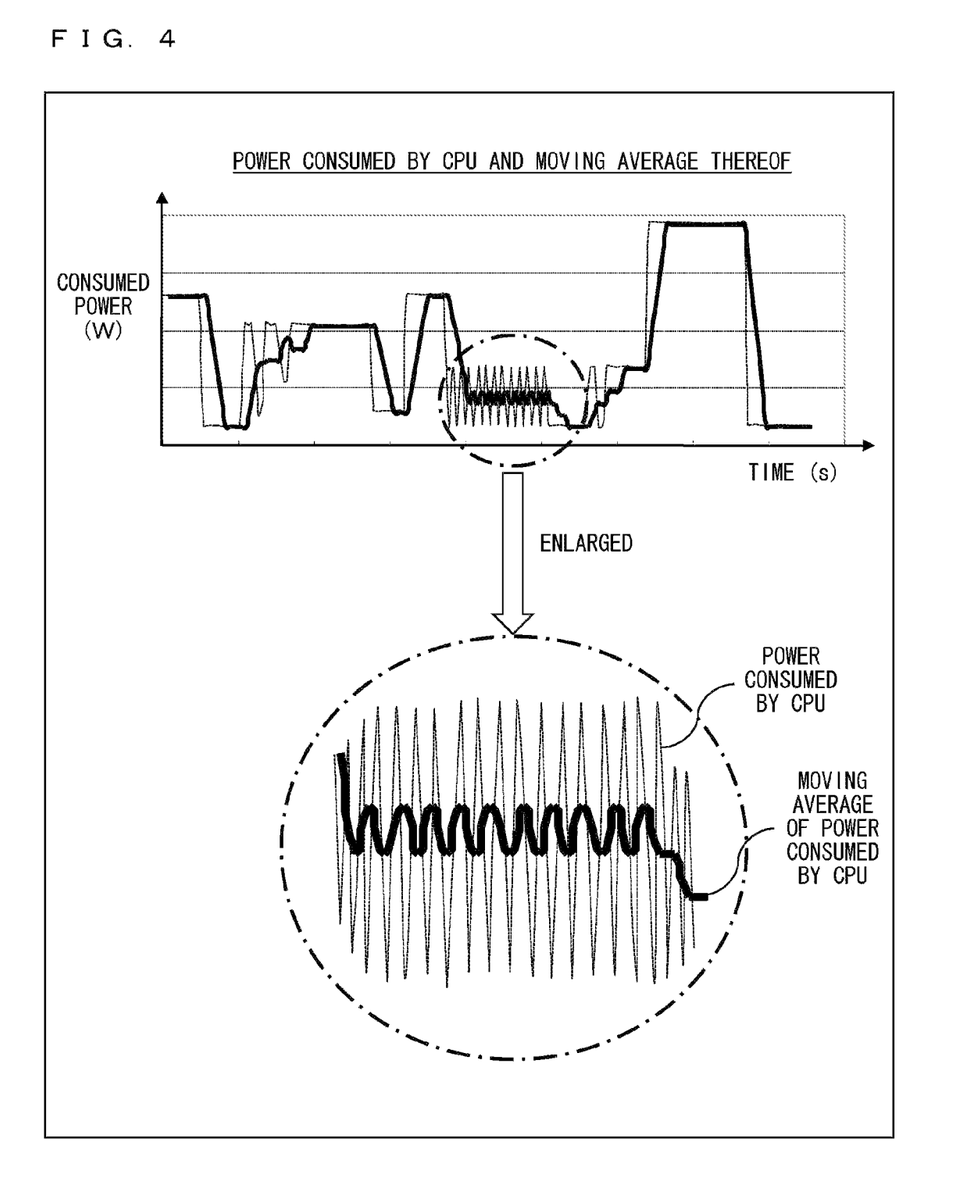
FIG. 4 is a diagram illustrating electric power consumed by the CPU 200 and a moving average thereof.

In the moving average calculation step S320, the moving average calculation section 120 calculates, based on the consumed electric power monitored in the electric power consumption monitoring step, a moving average of the electric power consumed by the CPU 200. FIG. 4 is a diagram illustrating electric power consumed by the CPU 200 and the moving average thereof. In FIG. 4, the horizontal axis represents a time. In FIG. 4, the electric power consumed by the CPU 200 (indicated by the thin dotted line), and the moving average of the electric power consumed by the CPU 200 (thick solid line) are indicated. The waveform of the electric power consumed by the CPU 200 more minutely and greatly varies in practice. The waveform is schematically indicated in FIG. 4. Therefore, the moving average calculation section 120 calculates the moving average based on the greatly varying electric power consumed by the CPU 200, thereby smoothing time-series data of the electric power consumed by the CPU 200.

In the state-of-load determination step S330, the state-of-load determination section 130 determines a state of operational load on the CPU 200, based on the moving average calculated in the moving average calculation step S320. As described above, the waveform of the electric power consumed by the CPU 200 more minutely and greatly varies in practice. Therefore, the state-of-load determination section 130 determines a state of operational load on the CPU 200, by using the moving average of the electric power consumed by the CPU 200, which is obtained through the smoothing.

Figure 5:
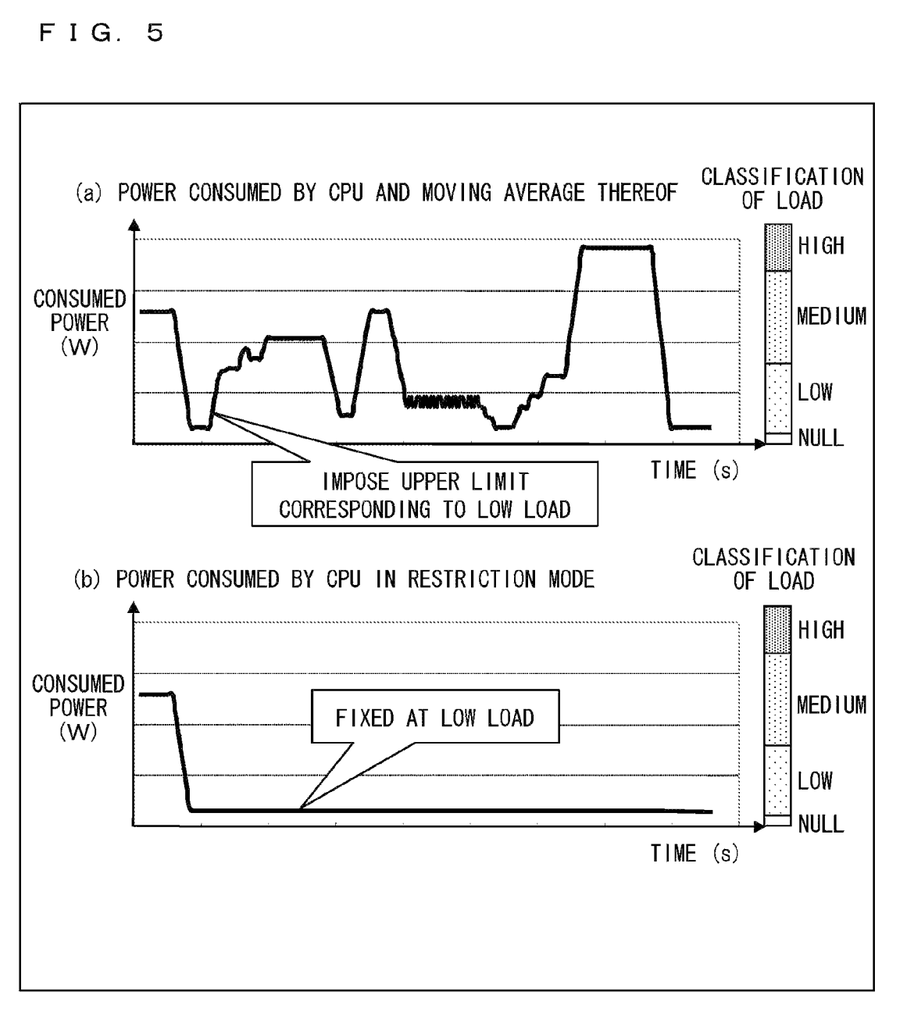
FIG. 5 is a diagram illustrating a moving average of electric power consumed by the CPU 200, and electric power consumed by the CPU 200 when an upper limit corresponding to a state of operational load on the CPU 200 has been imposed.

FIG. 5 is a diagram illustrating a moving average of electric power consumed by the CPU 200, and electric power consumed by the CPU 200 when an upper limit corresponding to a state of operational load on the CPU 200 has been imposed. In FIG. 5(a), load zones are defined by using the moving average of the electric power consumed by the CPU 200 in correspondence with electric power consumed by the CPU 200. In FIG. 5(a), the load zones are classified as a high load range, a medium load range, a low load range, and a null load range, in correspondence with the electric power consumed by the CPU 200. In the state-of-load determination step S330, the state-of-load determination section 130 determines whether the CPU 200 is operating under the high load, the medium load, the low load, or null load, based on the moving average of the electric power consumed by the CPU 200, which is obtained through the smoothing by the moving average calculation section 120 in the moving average calculation step S320.

For example, when the moving average of the electric power consumed by the CPU 200 is greater than or equal to a first threshold value and less than a second threshold value, the state-of-load determination section 130 may determine that the state of operational load on the CPU 200 indicates the low load. When the moving average of the electric power consumed by the CPU 200 is greater than or equal to the second threshold value and less than a third threshold value, the state-of-load determination section 130 may determine that the state of operational load on the CPU 200 indicates the medium load. When the moving average of the electric power consumed by the CPU 200 is greater than or equal to the third threshold value, the state-of-load determination section 130 may determine that the state of operational load on the CPU 200 indicates the high load. The classification of the load zones as the high load range, the medium load range, the low load range, and the null load range, and the first to the third threshold values used for determining the classified load zones may be previously stored in storage means such as a memory.

In the present embodiment, the load zones are classified as four ranges, that is, the high load, the medium load, the low load, and the null load ranges. However, the present invention is not limited thereto. The load zones may be classified as two ranges. In this case, one threshold value is used. Alternatively, the load zones may be classified as five or more ranges. In this case, four or more threshold values are used.

In the restriction period determination step S340, the control section 140 determines whether the CPU 200 operates in the restriction period during which the upper limit corresponding to the state of load determined in the state-of-load determination step S330 is imposed, or in the restriction release period during which the upper limit is not imposed. The restriction period and the restriction release period are preset based on, for example, performances of the power supply control device 100 and the CPU 200. The control section 140 receives a timing signal indicating the restriction period or the restriction release period which have been preset, and may determine, based on the timing signal, whether the CPU 200 operates in the restriction period or the restriction release period.

In the subsequent steps, the control section 140 controls the CPU 200 such that the CPU 200 is caused to operate in the restriction mode during the restriction period, and the CPU 200 is caused to operate in the restriction release mode during the restriction release period. Specifically, in the restriction period determination step S340, when the control section 140 determines that the timing signal indicates the restriction period, the process is advanced to the source power upper limit imposing step S350, and when the control section 140 determines that the timing signal indicates the restriction release period, the process is advanced to the source power upper limit imposing release step S360.

Thereafter, the control section 140 controls whether the upper limit of the source power is to be imposed in the source power upper limit imposing step S350 or imposing of the upper limit of the source power is to be released in the source power upper limit imposing release step S360, and the control section 140 supplies source power to the CPU 200 in the source power supply step S370.

Hereinafter, the process steps performed by the control section 140 in the source power upper limit imposing step S350 and the source power upper limit imposing release step S360 will be described in detail.

In the source power upper limit imposing step S350, the control section 140 imposes an upper limit of the source power to be supplied to the CPU 200, so as to correspond to a state of operational load on the CPU 200, which is determined in the state-of-load determination step S330. More specifically, for example, when operational load on the CPU 200 indicates the low load, it is inefficient to supply, to the CPU 200, the source power which is required under the high load or the medium load. Therefore, when the operational load on the CPU 200 indicates the low load, the source power required under the low load is sufficient as the source power to be supplied to the CPU 200. Therefore, the control section 140 imposes the upper limit corresponding to the low load, and performs control such that the source power is not supplied to the CPU 200 beyond necessity.

The electric power consumed by the CPU 200 when the upper limit corresponding to a state of operational load on the CPU 200 has been imposed will be described. FIG. 5(b) shows the electric power consumed by the CPU 200 when the upper limit corresponding to the state of operational load on the CPU 200 has been imposed. In FIG. 5(b), once the upper limit corresponding to the low load is imposed, and the source power to be supplied to the CPU 200 is restricted, the CPU 200 operates, after that, on the source power having been restricted. The electric power consumed by the CPU 200 is maintained so as not to be increased. If the electric power consumed by the CPU 200 is maintained so as not to be increased, the moving average of the electric power consumed by the CPU 200 remains low, and the load zone may remain classified as the low load range.

In other words, before the upper limit corresponding to the state of operational load on the CPU 200 has been imposed, the moving average (shown in FIG. 5(a)) of the electric power consumed by the CPU 200 varies such that, even if the load zone has been once classified as the low load range, the load zone then shifts to the medium load range and the high load range. Even if high source power in essence needs to be supplied to the CPU 200 such that the CPU 200 is caused to operate at a high speed (the medium load and the high load), once the source power is restricted to source power corresponding to the low load, the load zone may remain classified as the low load range.

Therefore, the restriction release period is provided in which the upper limit corresponding to the state of load determined by the state-of-load determination section 130 is not imposed, and the control section 140 causes the CPU 200 to operate in the restriction release mode.

In the source power upper limit imposing release step S360, the control section 140 performs control such that desired source power is supplied to the CPU 200 according to the operation of the CPU 200. Specifically, for example, even in a case where operational load on the CPU 200 indicates the low load, and the upper limit corresponding to the low load has been once imposed in the source power upper limit imposing step S350, imposing of the upper limit is released during the restriction release period, and the source power in essence required for the CPU 200 to run is supplied. "The source power in essence required for the CPU 200 to run" does not necessarily indicate the source power required under the high load or the medium load. "The source power in essence required for the CPU 200 to run" also includes low source power required under the null load or the low load.

Figure 6:
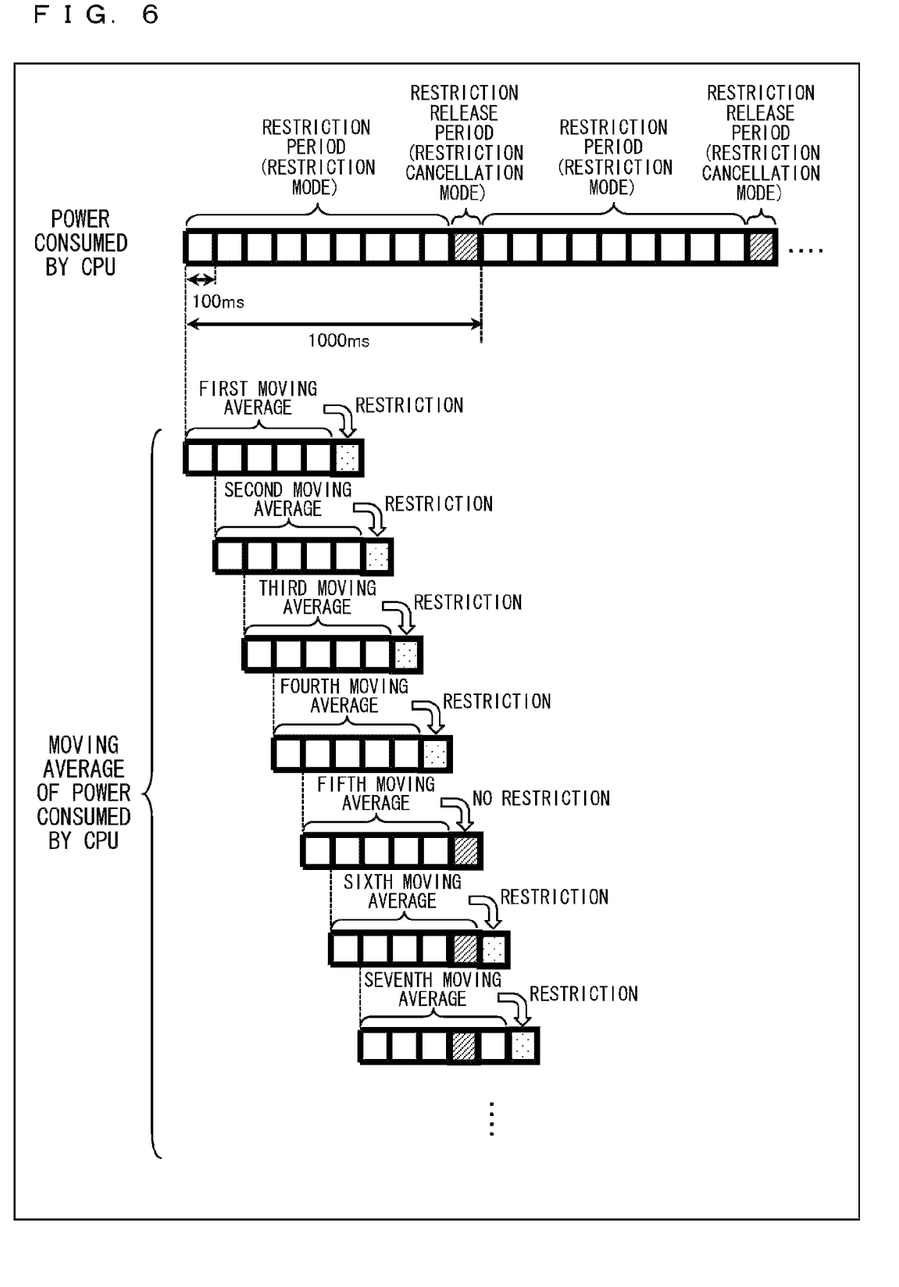
FIG. 6 is a diagram illustrating a method for calculating a moving average of electric power consumed by the CPU 200 in a case where the CPU 200 is caused to operate in a restriction mode during a restriction period, and the CPU 200 is caused to operate in a restriction release mode during a restriction release period.

A method for calculating a moving average of electric power consumed by the CPU 200 according to one embodiment of the present invention will be described. FIG. 6 is a diagram illustrating a method for calculating the moving average of the electric power consumed by the CPU 200 in a case where the CPU 200 is caused to operate in the restriction mode during the restriction period, and the CPU 200 is caused to operate in the restriction release mode during the restriction release period. In FIG. 6, the electric power consumed by the CPU 200 is monitored every 100 [ms], and the moving average of the electric power consumed by the CPU 200 is calculated by using the consumed electric power which is monitored every 100 [ms] five times.

In the present embodiment, the moving average of the electric power consumed by the CPU 200 is calculated as a simple moving average which is a simple average calculated without weighting the consumed electric power monitored every 100 [ms] five times. However, the moving average of the electric power consumed by the CPU 200 may be calculated as another type of moving average. For example, the moving average may be calculated as a weighted moving average by weighting the consumed electric power monitored every 100 [ms] five times, with use of a weight which is gradually reduced linearly from the consumed electric power most recently monitored (by multiplying the consumed electric power by a coefficient). Alternatively, the moving average may be calculated as an exponential moving average by weighting the consumed electric power monitored every 100 [ms] five times, with use of a weight which is gradually reduced exponentially from the consumed electric power most recently monitored (by multiplying the consumed electric power by a coefficient).

Among one cycle (1000 [ms]), 900 [ms] is defined as the restriction period, and 100 [ms] is defined as the restriction release period. Specifically, the moving average calculation section 120 firstly calculates a moving average (first moving average) of electric power consumed by the CPU 200, based on the consumed electric power monitored five times in 0 to 100 [ms], 100 [ms] to 200 [ms], 200 [ms] to 300 [ms], 300 [ms] to 400 [ms], and 400 [ms] to 500 [ms]. The state-of-load determination section 130 determines a state of operational load on the CPU 200, based on the first moving average. In 500 [ms] to 600 [ms] which is the restriction period, the control section 140 imposes the upper limit of the source power to be supplied to the CPU 200, so as to correspond to the state of load determined by the state-of-load determination section 130, thereby supplying the source power to the CPU 200.

Next, the cycle is shifted by 100 [ms], and the moving average calculation section 120 calculates a moving average (second moving average) of electric power consumed by the CPU 200, based on the consumed electric power monitored five times in 100 [ms] to 200 [ms], 200 [ms] to 300 [ms], 300 [ms] to 400 [ms], 400 [ms] to 500 [ms], and 500 [ms] to 600 [ms]. The state-of-load determination section 130 determines a state of operational load on the CPU 200, based on the second moving average. In 600 [ms] to 700 [ms] which is the restriction period, the control section 140 imposes the upper limit of the source power to be supplied to the CPU 200, so as to correspond to the state of load determined by the state-of-load determination section 130, thereby supplying the source power to the CPU 200.

Similarly, a third moving average and a fourth moving average are calculated, and the upper limit of the source power to be supplied to the CPU 200 is imposed to supply the source power to the CPU 200.

In the process steps described above, in a state where the source power to be supplied to the CPU 200 is restricted, the moving average of the electric power consumed by the CPU 200 is calculated, and the source power to be supplied to the CPU 200 is repeatedly restricted based on the moving average calculated.

The moving average calculation section 120 calculates, as a fifth moving average, a moving average of electric power consumed by the CPU 200, based on the consumed electric power monitored five times in 400 [ms] to 500 [ms], 500 [ms] to 600 [ms], 600 [ms] to 700 [ms], 700 [ms] to 800 [ms], and 800 [ms] to 900 [ms]. However, in 900 [ms] to 1000 [ms] which is the restriction release period, the control section 140 releases imposing of the upper limit of the source power to be supplied to the CPU 200, and supplies the source power to the CPU 200. In other words, in 900 [ms] to 1000 [ms] which is the restriction release period, the source power in essence required for the CPU 200 to run is supplied.

Further, in a state where the source power in essence required for the CPU 200 to run is supplied, the moving average calculation section 120 calculates a moving average of the electric power consumed by the CPU 200 as a sixth moving average. Therefore, the moving average represents an essential state of operational load on the CPU 200.

As a result, even when the upper limit corresponding to the low load has been imposed, the imposing of the upper limit is released during the restriction release period, and the source power in essence required for the CPU 200 to run is supplied. Accordingly, electric power can be supplied to the CPU 200 so as to correspond to the essential state of operational load on the CPU 200.

In the source power supply step S370, as described above, the control section 140 controls whether the upper limit of the source power to be supplied to the CPU 200 is imposed or released, and supplies the source power to the CPU 200.

Figure 7:
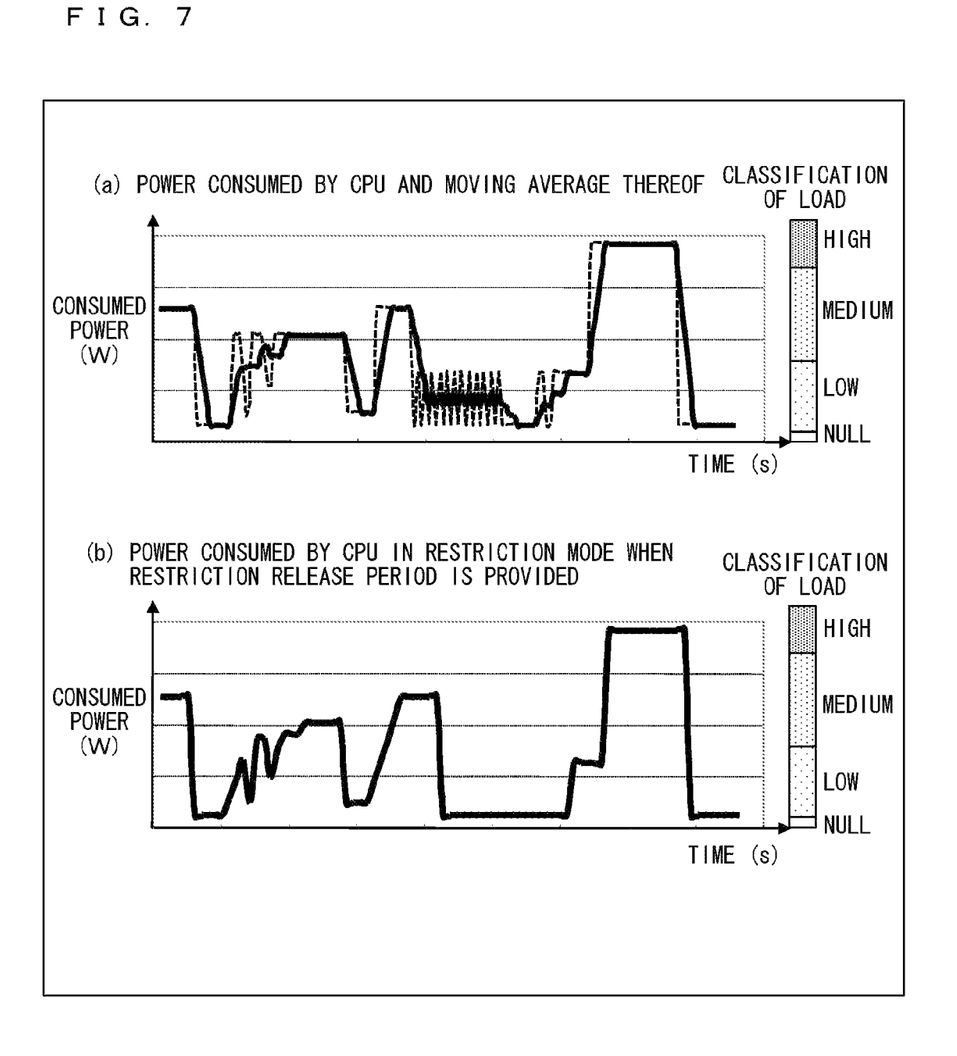
FIG. 7 is a diagram illustrating electric power consumed by the CPU 200, a moving average thereof, and electric power consumed by the CPU 200 when an upper limit corresponding to a state of operational load on the CPU 200 has been imposed in a state where the restriction release period is provided as shown in FIG. 6.

FIG. 7 is a diagram illustrating electric power consumed by the CPU 200, a moving average thereof, and electric power consumed by the CPU 200 when an upper limit corresponding to a state of operational load on the CPU 200 has been imposed in a state where the restriction release period is provided as shown in FIG. 6. In FIG. 7(*b*), even in a case where the upper limit corresponding to the low load has been once imposed to restrict the source power to be supplied to the CPU 200, when the restriction release period is provided as described above, the essential state of operational load on the CPU 200 can be considered in the subsequent process steps. More specifically, comparison between FIG. 7(*b*) and FIG. 5(*b*) will be described. In FIG. 5(*b*), once the load zone has been classified as the low load range, the load zone remains classified as the low load range in the subsequent process steps, whereas, in FIG. 7(*b*), even after the load zone has been temporarily classified as the low load range, the load zone shifts such that the load zone is classified as the medium load range and the high load range so as to correspond to the electric power in essence consumed by the CPU 200.

Further, as shown in FIG. 6, in a case where the restriction release period is provided, the electric power consumed by the CPU 200 when the upper limit corresponding to a state of operational load on the CPU 200 has been imposed, can early follow electric power consumed in essence by the CPU 200.

Figure 8:
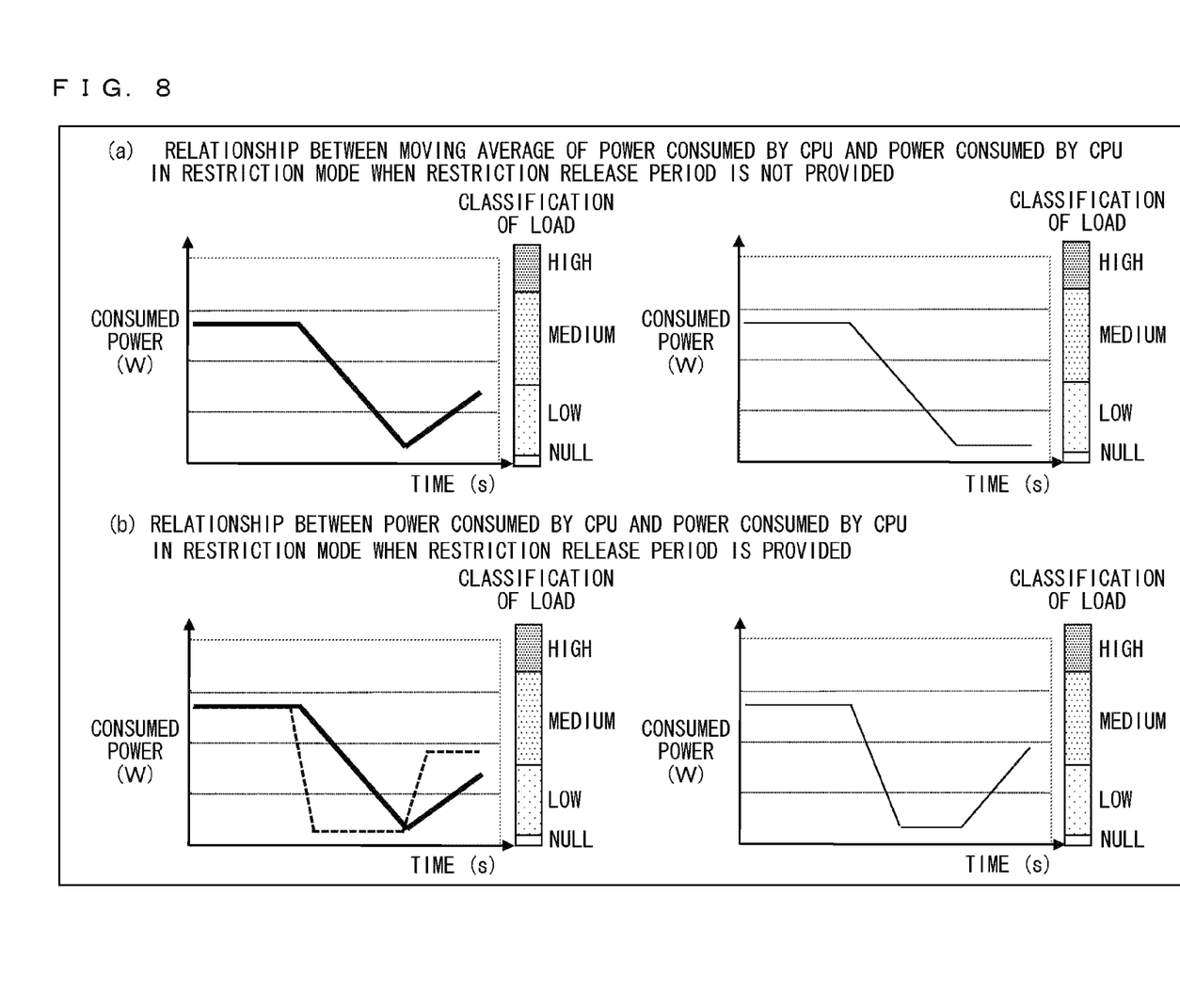
FIG. 8 is a diagram illustrating a relationship among: electric power consumed by the CPU 200; electric power consumed by the CPU 200 when the restriction period is provided, and the restriction release period is not provided; and electric power consumed by the CPU 200 when the restriction period and the restriction release period are provided.

FIG. 8 is a diagram illustrating a relationship among: electric power consumed by the CPU 200; electric power consumed by the CPU 200 when the restriction period is provided and the restriction release period is not provided; and electric power consumed by the CPU 200 when the restriction period and the restriction release period are provided. FIG. 8(*a*) shows a relationship between a moving average of electric power consumed by the CPU 200, and electric power consumed by the CPU 200 in the restriction mode when the restriction release period is not provided. FIG. 8(*b*) shows a relationship among electric power consumed by the CPU 200, a moving average of the consumed electric power, and electric power consumed by the CPU 200 in the restriction mode when the restriction release period is provided.

For example, in a case where the load zone shifts from the medium load range so as to be classified as the low load range, the electric power consumed by the CPU 200 in the restriction mode gradually varies when the restriction release period is not provided, as shown in FIG. 8(*a*). On the other hand, in a case where the load zone shifts from the medium load range so as to be classified as the low load range, the electric power consumed by the CPU 200 in the restriction mode immediately varies when the restriction release period is provided, as shown in FIG. 8(*b*). When the restriction release period is provided, and the source power in essence required by the CPU 200 is supplied, an essential state of operational load on the CPU 200 is considered, and the electric power consumed by the CPU 200 can early follow the electric power in essence consumed by the CPU 200.

As described above, in the electric power control device 100 and the electric power control method 300 according to one embodiment of the present invention, an optimum operational control in essence required for the CPU 200 to run can be performed according to a state of operational load on the CPU 200, thereby realizing reduced power control according to the operation of the CPU 200.

According to the present embodiment, the control section 140 controls the source power to be supplied to the CPU 200 to restrict the operation of the CPU 200, thereby realizing the reduced power control of an electronic device. However, a manner for restricting the operation of the CPU 200 is not limited thereto.

For example, the control section 140 may control the CPU 200 so as to restrict electric power on which the CPU 200 operates. Specifically, the control section 140 causes the CPU 200 to impose the upper limit of electric power on which the CPU 200 operates, during the restriction period, according to a state of operational load on the CPU 200, thereby controlling the operation of the CPU 200. On the other hand, the control section 140 causes the CPU 200 to release the imposing of the upper limit, during the restriction release period, thereby controlling the operation of the CPU 200. As a result, the CPU 200 suppresses the electric power consumed by the CPU 200 itself, while an optimum operational control in essence required for the CPU 200 to run can be performed according to a state of operational load on the CPU 200, thereby realizing reduced power control according to the working load of the CPU 200.

Further, the control section 140 may control the operation of the CPU so as to restrict a frequency at which the CPU 200 operates. Specifically, the control section 140 imposes the upper limit of a frequency (clock) at which the CPU 200 operates, during the restriction period, according to a state of operational load on the CPU 200, thereby controlling the operation of the CPU 200. On the other hand, the control section 140 cancels the imposing of the upper limit for the CPU 200 during the restriction release period to control the operation of the CPU 200. As a result, electric power consumed by the CPU 200 is suppressed, while an optimum operational control in essence required for the CPU 200 to run can be performed according to a state of operational load on the CPU 200, thereby realizing reduced power control according to the operation of the CPU 200.

While the invention has been described in detail, the foregoing description is in all aspects illustrative and not restrictive. It will be understood that numerous other modifications and variations can be devised without departing from the scope of the invention.

What is claimed is:

1. An electric power control device connected via a control interface with an electronic device, for controlling electric power supplied from a power supply to, and consumed by, the electronic device, the electric power control device comprising:
    a power consumption monitoring section for monitoring, via the control interface, the supply current and voltage of the electronic device, and from the monitored supply current and voltage calculating the actual electric power consumed by the electronic device;
    a moving average calculation section for calculating a moving average of the power consumption of the electronic device, based on the actual power consumption monitored by the power consumption monitoring section;
    a state-of-load determination section for determining state of the operational load on the electronic device, based on the moving average calculated by the moving average calculation section; and
    a control section configured to control, according to the operational load state determined by the state-of-load determination section, the electronic device to operate either in a restriction mode in which the control section imposes an upper limit on the power supplied from the power supply to the electronic device, or in a restriction release mode in which the control section releases imposition of the upper limit on the power supplied from the power supply to the electronic device.

2. The electric power control device according to claim 1, wherein the control section is further configured to select between the restriction mode and the restriction release mode based on a timing signal indicating that the electronic device operates in a restriction period during which the upper limit is imposed on the power supplied from the power supply to the electronic device, or in a restriction release period during which the upper limit is not imposed on the power supplied from the power supply to the electronic device.

3. The electric power control device according to claim 1, wherein the state-of-load determination section determines, based on the moving average calculated by the moving average calculation section, a load zone preestablished in correspondence with the power consumption of the electronic device.

4. The electric power control device according to claim 3, wherein in the restriction mode the control section imposes, in correspondence with the load zone, the upper limit of source power supplied to the electronic device.

5. The electric power control device according to claim 3, wherein in the restriction mode the control section imposes, in correspondence with the load zone, the upper limit of power to a central processing unit of the electronic device.

6. The electric power control device according to claim 3, wherein in the restriction mode the control section imposes, in correspondence with the load zone, the upper limit of operating frequency of a central processing unit of the electronic device.

7. The electric power control device according to claim 3, wherein the load zone is classified into a plurality of load ranges.

8. The electric power control device according to claim 1, wherein the electronic device is any one of a portable personal computer, a portable information terminal, and a mobile telephone.

9. An electric power control method for execution by an electric power control device connected via a control interface with an electronic device, to control electric power supplied from a power supply to, and consumed by the electronic device, the electric power control method comprising:
    a power consumption monitoring step of monitoring, via the control interface, the supply current and voltage of the electronic device, and from the monitored supply current and voltage calculating the actual electric power consumed by the electronic device;
    a moving average calculation step of calculating a moving average of the power consumption of the electronic device, based on the actual power consumption monitored in the power consumption monitoring step;
    a state-of-load determination step of determining state of the operational load on the electronic device, based on the moving average calculated in the moving average calculation step;
    a restriction period determination step of determining, according to a preset timing signal, whether the electronic device is operatig in a restriction period during which an upper limit in accordance with the state of load determined in the state-of-load determination step is imposed on the power supplied from the power supply to the electronic device, or in a restriction release period during which the upper limit is not imposed on the power supplied from the power supply to the electronic device; and
    an electronic device control step of controlling operation of the electronic device, according to the operational load state determined by the state-of-load determination section, by imposing the upper limit on the power supplied from the power supply to the electronic device when in the restriction period determination step the device is determined to be operating in the restriction period, and by not imposing the upper limit on the power supplied from the power supply to the electronic device when in the restriction period determination step the device is determined to be operating in the restriction release period.

* * * * *